(12) United States Patent
Crawford, Jr.

(10) Patent No.: US 9,656,589 B2
(45) Date of Patent: May 23, 2017

(54) STORAGE AND TRANSPORTATION SYSTEM

(71) Applicant: Odell Crawford, Jr., Princeton, IN (US)

(72) Inventor: Odell Crawford, Jr., Princeton, IN (US)

( * ) Notice: Subject to any disclaimer, the term of this patent is extended or adjusted under 35 U.S.C. 154(b) by 12 days.

(21) Appl. No.: 14/802,008

(22) Filed: Jul. 17, 2015

(65) Prior Publication Data

US 2017/0015230 A1 Jan. 19, 2017

(51) Int. Cl.
*B60P 1/52* (2006.01)
*B62D 33/02* (2006.01)

(52) U.S. Cl.
CPC ............ *B60P 1/52* (2013.01); *B62D 33/0207* (2013.01)

(58) Field of Classification Search
CPC ........ B60P 1/003; B60P 1/52; B62D 33/0207; B60R 5/04; B60R 9/06; B60R 9/065
USPC .......................................... 224/402–405, 281
See application file for complete search history.

(56) References Cited

U.S. PATENT DOCUMENTS

| | | | |
|---|---|---|---|
| 2,852,303 A * | 9/1958 | Hopson | B62D 33/08 296/26.09 |
| 4,647,110 A * | 3/1987 | McKee | B60P 1/32 298/1 A |
| 4,909,558 A * | 3/1990 | Roshinsky | B60R 13/01 296/37.6 |
| 5,649,731 A * | 7/1997 | Tognetti | B62D 33/0273 296/26.09 |
| 5,931,632 A | 8/1999 | Dongilli et al. | |
| 6,065,792 A * | 5/2000 | Sciullo | B60P 1/003 296/26.09 |
| 6,116,673 A | 9/2000 | Clonan | |
| 6,312,034 B1 | 11/2001 | Coleman, II et al. | |
| 6,318,780 B1 * | 11/2001 | St. Aubin | B60P 1/003 296/26.09 |
| 7,090,275 B2 * | 8/2006 | Pero | B60P 1/003 296/26.09 |
| 7,128,356 B2 | 10/2006 | Bassett | |
| 7,175,060 B1 | 2/2007 | Carpenter et al. | |
| 7,530,618 B2 | 5/2009 | Collins et al. | |
| 7,543,873 B1 * | 6/2009 | Thornsberry | B60P 1/003 224/403 |
| 8,033,776 B2 | 10/2011 | Calhoun | |
| D659,632 S | 5/2012 | Jordan | |
| 9,346,389 B2 * | 5/2016 | Ferkul | B60P 1/32 |
| 2006/0163828 A1 * | 7/2006 | Renz | B62B 3/02 280/79.11 |

* cited by examiner

*Primary Examiner* — Corey Skurdal

(57) ABSTRACT

A storage and transportation system includes a vehicle that has a bed. A cart is positioned within the bed and the cart may retain objects within the bed. A pair of rollers is provided and each of the rollers is coupled to the cart. Each of the rollers rollably engages the bed such that the cart may facilitate the objects to be rolled outwardly from the bed. A handle is coupled to the cart and the handle may be manipulated thereby facilitating the cart to be rolled along the bed. The cart is selectively rolled toward the back end of the bed thereby facilitating the objects to be removed from the bed.

8 Claims, 4 Drawing Sheets

STORAGE AND TRANSPORTATION SYSTEM

BACKGROUND OF THE DISCLOSURE

Field of the Disclosure

The disclosure relates to transportation devices and more particularly pertains to a new transportation device having a cart that is rollably positioned within a bed of a truck.

SUMMARY OF THE DISCLOSURE

An embodiment of the disclosure meets the needs presented above by generally comprising a vehicle that has a bed. A cart is positioned within the bed and the cart may retain objects within the bed. A pair of rollers is provided and each of the rollers is coupled to the cart. Each of the rollers rollably engages the bed such that the cart may facilitate the objects to be rolled outwardly from the bed. A handle is coupled to the cart and the handle may be manipulated thereby facilitating the cart to be rolled along the bed. The cart is selectively rolled toward the back end of the bed thereby facilitating the objects to be removed from the bed.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
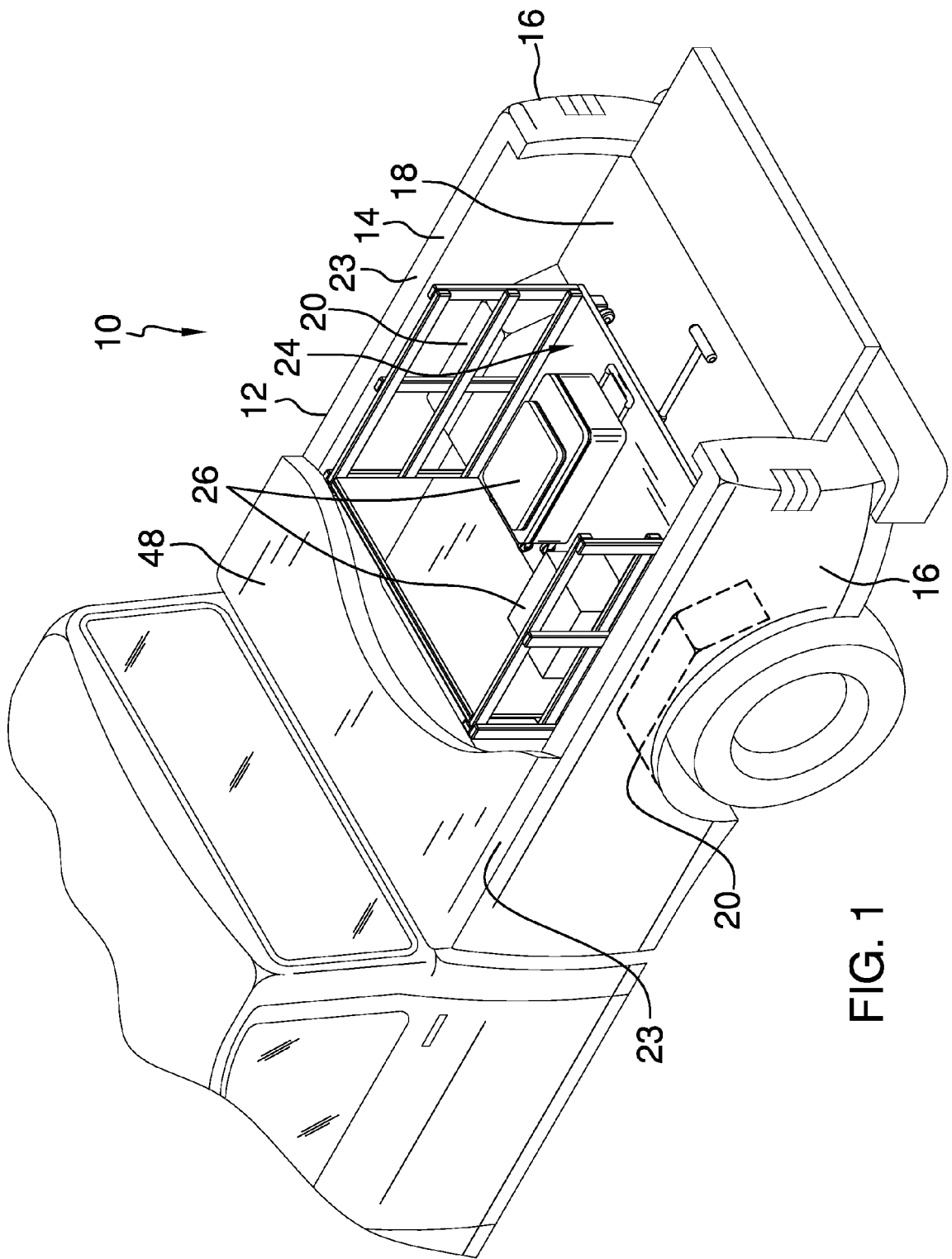
FIG. 1 is a top perspective view of a storage and transportation system according to an embodiment of the disclosure.
Figure 2:
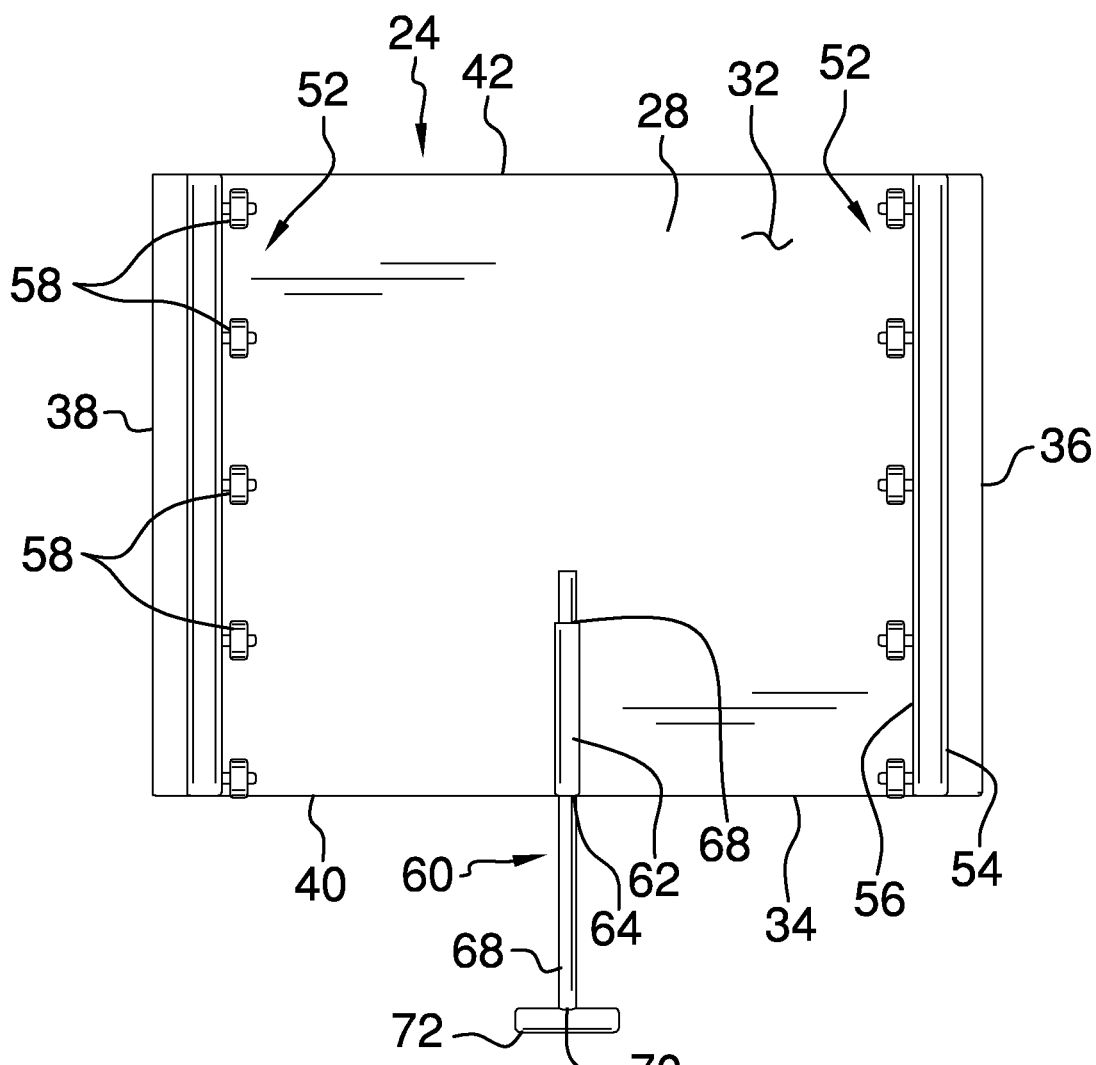
FIG. 2 is a bottom view of an embodiment of the disclosure.
Figure 3:
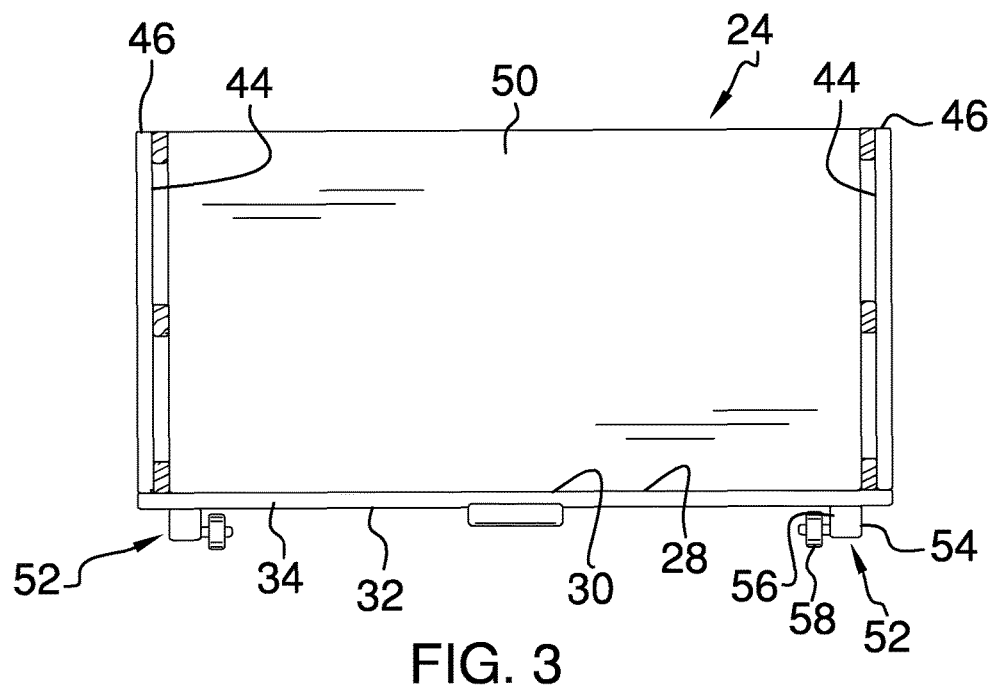
FIG. 3 is a front view of an embodiment of the disclosure.
Figure 4:
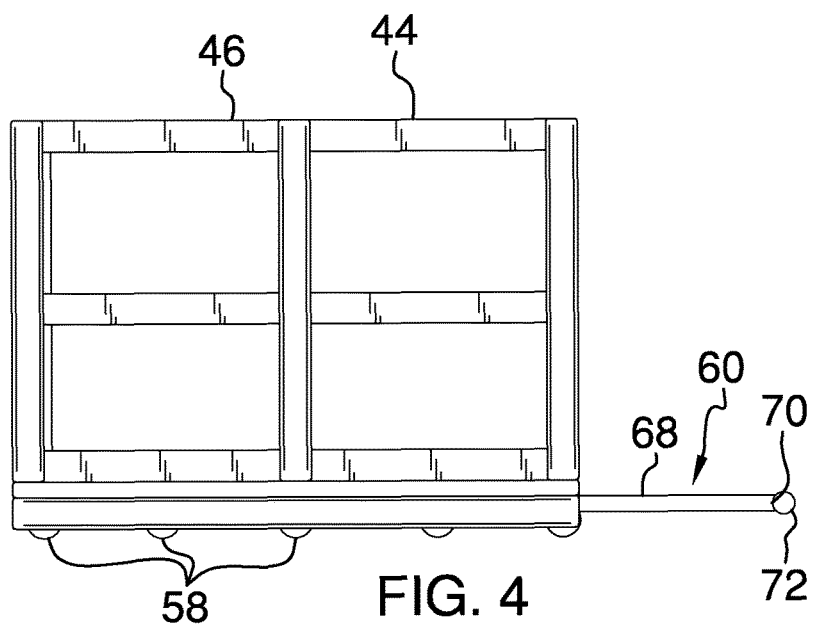
FIG. 4 is a left side view of an embodiment of the disclosure.
Figure 5:
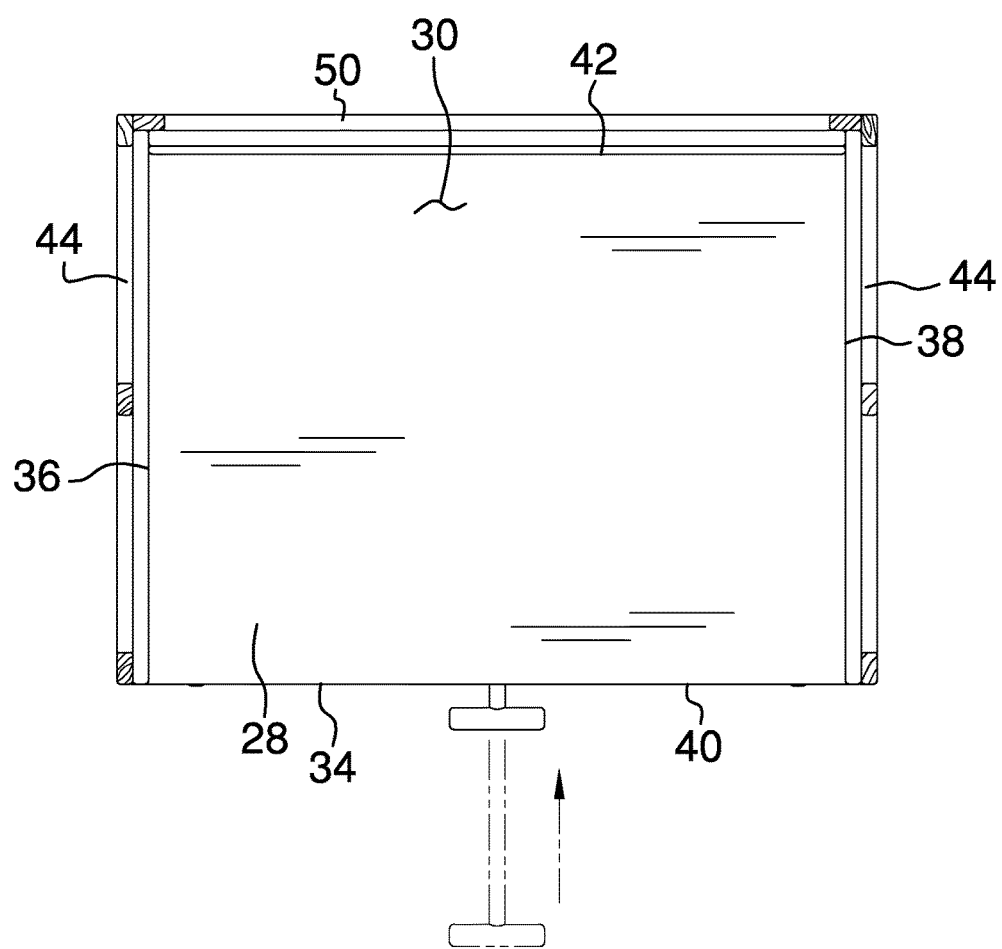
FIG. 5 is a top view of an embodiment of the disclosure.

With reference now to the drawings, and in particular to FIGS. 1 through 5 thereof, a new transportation device embodying the principles and concepts of an embodiment of the disclosure and generally designated by the reference numeral 10 will be described.

As best illustrated in FIGS. 1 through 5, the storage and transportation system 10 generally comprises a vehicle 12 that has a bed 14. The bed 14 has a pair of lateral walls 16, a basal wall 18, a pair of wheel wells 20 and a back end 22. Each of the lateral walls 16 is spaced apart from each other and extends upwardly from the basal wall 18 and each of the lateral walls 16 has a distal edge 23 with respect to the basal wall 18. Each of the wheel wells 20 extends upwardly from the basal wall 18. Each of the wheel wells 20 is positioned to abut an associated one of the lateral walls 16 and the back end 22 is open. The vehicle 12 may comprise a pickup or the like.

A cart 24 is provided and the cart 24 is positioned within the bed 14. The cart 24 may retain objects 26 within the bed 14. The cart 24 comprises a base 28 that has a top surface 30, a bottom surface 32 and a peripheral edge 34 extending between the top surface 30 and the bottom surface 32. The peripheral edge 34 has a first lateral side 36, a second lateral side 38, a front side 40 and a back side 42. The top surface 30 may have the objects 26 positioned thereon. The base 28 is positioned on the basal wall 18 such that the base 28 extends substantially between the wheel wells 20.

A pair of gates 44 is provided and each of the gates 44 is coupled to and extends upwardly from the top surface 30. Each of the gates 44 is coextensive with an associated one of the first lateral side 36 and the second lateral side 38 and each of the gates 44 has a distal edge 46 with respect to the top surface 30. Each of the gates 44 has a height that is less than a height of each of the lateral walls 16 of the bed 14. Thus, the distal edge 46 of each of the gates 44 is positioned below the distal edge 23 of each of the lateral walls 16 such that gates 44 are prevented from engaging a cover 48 on the bed 14.

A stop 50 is coupled to and extends upwardly from the top surface 30. The stop 50 is coextensive with the front side 40 of the base 28 such that the stop 50 extends between each of the gates 44. The stop 50 has a height that is equal to a height of each of the gates 44 such that the stop 50 is prevented from engaging the cover 48 on the bed 14. Additionally, the stop 50 retains the objects 26 on the cart 24.

A pair of rollers 52 is provided and each of the rollers 52 is coupled to the cart 24. Each of the rollers 52 rollably engages the bed 14 such that the cart 24 facilitates the objects 26 to be rolled outwardly from the bed 14. Each of the rollers 52 is positioned on the bottom surface 32 of the base 28 and each of the rollers 52 is coextensive with an associated one of the first lateral side 36 and the second lateral side 38 of the base 28.

Each of the rollers 52 comprises a track 54 that is coupled to the bottom surface 32 of the base 28. The track 54 extends between the front side 40 and the back side 42 of the base 28 and the track 54 has an inwardly facing surface 56 with respect to the peripheral edge 34 of the base 28. A plurality of wheels 58 is provided and each of the wheels 58 is rotatably coupled to the inwardly facing surface 56. The wheels 58 are spaced apart from each other and distributed along the track 54. Each of the wheels 58 rolls along the basal wall 18 of the bed 14.

A handle 60 is coupled to the cart 24 such that the handle 60 may be manipulated thereby facilitating the cart 24 to be rolled along the bed 14. The cart 24 is selectively rolled toward the back end 22 of the bed 14 thereby facilitating the objects 26 to be removed from the cart 24. The handle 60 comprises a tube 62 that is coupled to the bottom surface 32 of the base 28. The tube 62 has a first end 64 and a second end 66 and the first end 64 is aligned with the front side 40 of the base 28. The tube 62 is centrally positioned on the base 28.

A first member 68 is slidably positioned within the tube 62 and the first member 68 has a distal end 70 with respect to the tube 62. A grip 72 is coupled to the distal end 70 such that the grip 72 is oriented transversely with respect to the first member 68. The handle 60 is positionable in an extended position having the grip 72 being spaced from the tube 62 thereby facilitating the grip 72 to be gripped. The handle 60 is positionable in a retracted position having the grip 72 being positioned adjacent to the tube 62.

In use, the cart 24 is rolled toward the back end 22 of the bed 14 and the objects 26 are positioned within the cart 24. The cart 24 is rolled forwardly away from the back end 22 of the bed 14. The handle 60 is positioned in the retracted position and the vehicle 12 is driven. The handle 60 is positioned in the extended position and the cart 24 is rolled toward the back end 22 of the bed 14 after the vehicle 12 is driven. Thus, the objects 26 are removable from the cart 24.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A storage and transportation system comprising:
    a vehicle having a bed, said bed having a pair of lateral walls, a basal wall, a pair of wheel wells and a back end, each of said lateral walls being spaced apart from each other and extending upwardly from said basal wall, each of said lateral walls having a distal edge with respect to said basal wall, each of said wheel wells extending upwardly from said basal wall, each of said wheel wells being positioned to abut an associated one of said lateral walls, said back end being open;
    a cart being positioned within said bed wherein said cart is configured to retain objects within said bed, said cart including a base, said base having a top surface, a bottom surface and a peripheral edge extending between said top surface and said bottom surface, said peripheral edge having a first lateral side, a second lateral side, a front side and a back side, said top surface being configured to have the objects positioned thereon, said base being positioned on said basal wall such that said base extends substantially between said wheel wells;
    a pair of rollers, each of said rollers being coupled to said cart, each of said rollers rollably engaging said bed wherein said cart is configured to facilitate the objects to be rolled outwardly from said bed, wherein each of said rollers is positioned on said bottom surface of said base, each of said rollers being coextensive with an associated one of said first lateral side and said second lateral side of said base, wherein each of said rollers comprises a track being coupled to said bottom surface of said base, said track extending between said front side and said back side of said base, said track having an inwardly facing surface with respect to said peripheral edge of said base, wherein each of said rollers further comprises a plurality of wheels, each of said wheels being rotatably coupled to said inwardly facing surface, said wheels being spaced apart from each other and distributed along said track, each of said wheels rolling along said basal wall of said bed; and
    a handle being coupled to said cart wherein said handle is configured to be manipulated thereby facilitating said cart to be rolled along said bed, said cart being selectively rolled toward said back end of said bed thereby facilitating the objects to be removed from said bed.

2. The system according to claim 1, wherein said cart further comprises a pair of gates, each of said gates being coupled to and extending upwardly from said top surface, each of said gates being coextensive with an associated one of said first lateral side and said second lateral side, each of said gates having a distal edge with respect to said top surface.

3. The system according to claim 2, wherein:
    said bed has a pair of lateral walls, each of said lateral walls having a distal edge; and
    each of said gates has a height being less than a height of each of said lateral walls of said bed such that said distal edge of each of said gates is positioned below said distal edge of each of said lateral walls.

4. The system according to claim 2, wherein said cart further comprises a stop being coupled to and extending upwardly from said top surface, said stop being coextensive with said front side of said base such that said stop extends between each of said gates, said stop having a height being equal to a height of each of said gates.

5. The system according to claim 1, wherein said handle comprises a tube being coupled to said bottom surface of said base, said tube having a first end and a second end, said first end being aligned with said front side of said base, said tube being centrally positioned on said base.

6. The system according to claim 5, wherein said handle further comprises a first member being slidably positioned within said tube, said first member having a distal end with respect to said tube.

7. The system according to claim 1, wherein said handle further comprises a grip being coupled to said distal end such that said grip is oriented transversely with respect to said first member, said handle being positionable in an extended position having said grip being spaced from said tube, said handle being positionable in a retracted position having said grip being positioned adjacent to said tube.

8. A storage and transportation system comprising:
    a vehicle having a bed, said bed having a pair of lateral walls, a basal wall, a pair of wheel wells and a back end, each of said lateral walls being spaced apart from each other and extending upwardly from said basal wall, each of said lateral walls having a distal edge with respect to said basal wall, each of said wheel wells extending upwardly from said basal wall, each of said wheel wells being positioned to abut an associated one of said lateral walls, said back end being open; and
    a cart being positioned within said bed wherein said cart is configured to retain objects within said bed, said cart comprising:
        a base, said base having a top surface, a bottom surface and a peripheral edge extending between said top surface and said bottom surface, said peripheral edge having a first lateral side, a second lateral side, a front side and a back side, said top surface being configured to have the objects positioned thereon, said base being positioned on said basal wall such that said base extends substantially between said wheel wells, a pair of gates, each of said gates being coupled to and extending upwardly from said top surface, each of said gates being coextensive with an associated one of said first lateral side and said second lateral side, each of said gates having a distal edge with respect to said top surface, each of said gates having a height being less than a height of each of said lateral walls of said bed such that said distal edge of each of said gates is positioned below said distal edge of each of said lateral walls, and a stop being coupled to and extending upwardly from said top surface, said stop being coextensive with said front side of said base such that said stop extends between each of said gates, said stop having a height being equal to a height of each of said gates;

a pair of rollers, each of said rollers being coupled to said cart, each of said rollers rollably engaging said bed wherein said cart is configured to facilitate the objects to be rolled outwardly from said bed, each of said rollers being positioned on said bottom surface of said base, each of said rollers being coextensive with an associated one of said first lateral side and said second lateral side of said base, each of said rollers comprising:

a track being coupled to said bottom surface of said base, said track extending between said front side and said back side of said base, said track having an inwardly facing surface with respect to said peripheral edge of said base, and a plurality of wheels, each of said wheels being rotatably coupled to said inwardly facing surface, said wheels being spaced apart from each other and distributed along said track, each of said wheels rolling along said basal wall of said bed; and a handle being coupled to said cart wherein said handle is configured to be manipulated thereby facilitating said cart to be rolled along said bed, said cart being selectively rolled toward said back end of said bed thereby facilitating the objects to be removed from said bed, said handle comprising:

a tube being coupled to said bottom surface of said base, said tube having a first end and a second end, said first end being aligned with said front side of said base, said tube being centrally positioned on said base, a first member being slidably positioned within said tube, said first member having a distal end with respect to said tube, and a grip being coupled to said distal end such that said grip is oriented transversely with respect to said first member, said handle being positionable in an extended position having said grip being spaced from said tube, said handle being positionable in a retracted position having said grip being positioned adjacent to said tube.

* * * * *